United States Patent [19]

Pozniak

[11] Patent Number: 4,672,843
[45] Date of Patent: Jun. 16, 1987

[54] PEAK COMBUSTION PRESSURE TIMING DETECTOR FOR IC ENGINE USING INTAKE VALVE DEFORMATION

[75] Inventor: Donald J. Pozniak, Utica, Mich.

[73] Assignee: General Motors Corporation, Detroit, Mich.

[21] Appl. No.: 853,924

[22] Filed: Apr. 21, 1986

[51] Int. Cl.$^4$ ............................................. G01M 15/00
[52] U.S. Cl. ...................................... 73/117.3; 73/115
[58] Field of Search ................. 73/35, 115, 116, 117.3

[56] References Cited

U.S. PATENT DOCUMENTS 4,491,010 1/1985 Brandt et al. ............................ 73/35

Primary Examiner—Jerry W. Myracle
Attorney, Agent, or Firm—Robert M. Sigler

[57] ABSTRACT

A peak combustion pressure timing (LPP) sensor is disclosed for a spark ignited internal combustion engine comprising a probe fixed with respect to the stationary portion of the engine and disposed adjacent a detectable member moving longitudinally with the valve stem of a combustion chamber intake poppet valve as the valve closing portion of the poppet valve is distorted by combustion pressure. The probe may be a proximity probe which senses the longitudinal movement of the member and thus the valve stem and generates an electric output signal thereof. Further apparatus senses the signal peak value, which signifies peak combustion pressure, and references the peak value with the crankshaft rotational position of the engine so as to indicate the timing thereof.

2 Claims, 2 Drawing Figures

PEAK COMBUSTION PRESSURE TIMING DETECTOR FOR IC ENGINE USING INTAKE VALVE DEFORMATION

BACKGROUND OF THE INVENTION

This invention relates to a detector of the location of peak combustion pressure (LPP) in the combustion chamber of an internal combustion engine. Such a detector is useful in LPP ignition timing control systems, in which ignition timing is controlled so as to maintain peak combustion chamber pressure at a predetermined crankshaft rotational angle. Such systems are used in calibration of conventional ignition timing systems for internal combustion engines and have been suggested for closed loop control of such engines in motor vehicles.

An LPP ignition timing control requires a sensor capable of detecting the timing of peak combustion pressure. Sensors exist which have proven satisfactory in calibration work. An example is the engine headbolt sensor shown in the U.S. Pat. No. 4,491,010 to Brandt et al, issued Jan. 1, 1985. Other sensors have been incorporated with engine spark plugs in an effort to find an access point to the combustion chamber without retooling an engine block or head. However, there is always a search for a sensor using a different approach, which might show an improvement in cost, output signal, ease of assembly or installation, reliability or some other feature.

SUMMARY OF THE INVENTION

This invention is a peak combustion pressure timing detector which uses a portion of the engine exposed to the combustion pressure itself to help generate an electromagnetic signal thereof, the peak of which may be referenced to crankshaft rotational position for the timing thereof. The portion of the engine used is an intake valve of the poppet type. The valve is closed during combustion; and the valve closing portion is deformable by the combustion pressure. The valve further includes a stem which moves longitudinally as the closing member deforms to translate the deformation away from the combustion chamber. The valve spring retainer, rocker arm or some other member riding on the valve stem moves with the stem; and this motion is sensed by a detector such as a proximity detector. Only relative motion need be sensed, since it is only the timing of the peak, and not the absolute value thereof, which is required. Further details and advantages of the invention will be apparent from the accompanying drawings and following description of a preferred embodiment.

DESCRIPTION OF THE PREFERRED EMBODIMENT

Figure 1:
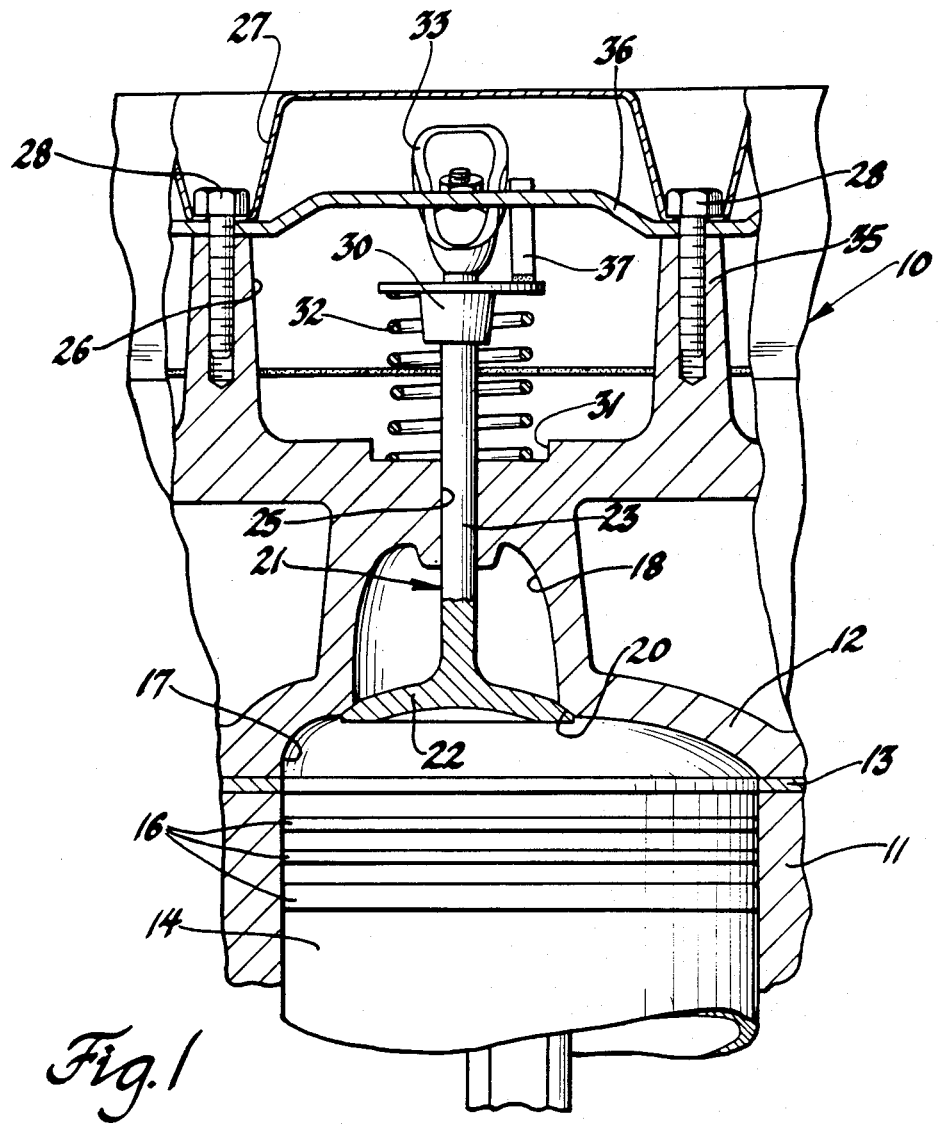
FIG. 1 shows a cutaway view of a combustion chamber in an engine employing a sensor according to this invention.

Referring to FIG. 1, a spark ignited, internal combustion engine 10 includes a block 11 and head 12 of standard construction separated by a head gasket 13 and defining, along with piston 14 having rings 16, a combustion chamber 17. Head 12 includes an intake passage 18 adapted to convey a combustible charge from fuel charge forming apparatus of normal construction, not shown, to combustion chamber 17 through an intake valve opening 20, which may be opened or closed by an intake valve 21.

Intake valve 21 is a standard poppet valve having a valve closing member 22 situated within combustion chamber 17 and a valve stem 23 projecting substantially normally upward therefrom, in FIG. 1, through intake valve opening 20, intake passage 18 and a valve stem opening 25 in head 12 to a chamber 26 defined between head 12 and a valve cover 27 affixed thereto by bolts 28. Upon the upper portion of valve stem 23 rides a valve spring retainer 30. The surface of head 12 opposite valve cover 27 defines a spring retaining seat 31; and between seat 31 and retainer 30, within chamber 26, is compressed a valve spring 32, which normally biases valve stem 23 upward toward valve cover 27 and thus biases valve closing member 22 against intake opening 20 to close the same. Also within chamber 26 is a rocker arm 33, which is actuable by a camshaft and lifter, not shown, to press downward on the end of valve stem 23 and push valve closing member 22 away from head 12 to open intake valve opening 20 to communication with intake passage 18. The opening of the intake valve is timed through the coordination of the rotational positions of the camshaft and an engine crankshaft, driven by piston 14 but not shown in the Figure, to occur as piston 14 is enlarging combustion chamber 17, so that a combustible charge is drawn into combustion chamber 17.

When the full combustible charge is within combustion chamber 17, rocker arm 33 allows valve 21 to close the intake valve opening 20. Upward movement of piston 14 compresses the combustible charge, with ignition apparatus, not shown, eventually causing ignition thereof. The resulting combustion greatly increases the pressure within combustion chamber 17, which is closed to contain it. The pressure of combustion is sufficiently great to distort valve closing member 22 by moving its center upward by as much as several thousandths of an inch. As its center moves upward, valve stem 23 moves longitudinally upward through the same distance and carries valve spring retainer 30 with it. This occurs with no modification of the standard engine apparatus, and it may be enhanced by proper design to maximize the longitudinal movement of valve spring retainer 30 with peak pressure in combustion chamber 17.

In order to sense this longitudinal movement, a stiff metal mounting plate 36 is held by bolts 28 between mounting studs 35 and valve cover 27. Mounting plate 36 carries a sensor 37 of vertical valve spring retainer movement. Sensor 37 is preferably of the proximity type, with a sensing coil in close proximity to the valve spring retainer 30 on valve stem 23 when valve 21 is closed. An electric current in the coil is affected by the changing reluctance due to movement of the nearby valve spring retainer 30 to provide an output electric signal of said movement. The signal does not have to accurately indicate absolute position, since only the peak need be detected. To enhance the signal to noise ratio and ease of peak detection, sensor 37 should be kept as still as possible relative to head 12 in spite of the vibrations of engine 10. Mounting studs 35 provide great resistance to vertical vibrations at the mounting points of mounting plate 36; and mounting plate 36 may be made as thick as desired, with ribbing or other means to reduce vibration thereof between mounting studs 35. Examples of proximity sensors sufficiently rugged and suitable for use as sensor 37 are Bently Nevada (R) models 306 or 3115. An alternative placement for sensor 37 is above the portion of rocker arm 33 contacting valve 21, since this part also moves upward with distortion of valve closing member 22. An alternative type of sensor 37 may be a piezoelectric element fixed in contact with valve spring retainer 30 when valve 21 is in its closed position, so that upward movement thereof due to valve distortion increases the force on the piezoelectric element and thus generates an output voltage therefrom.

Figure 2:
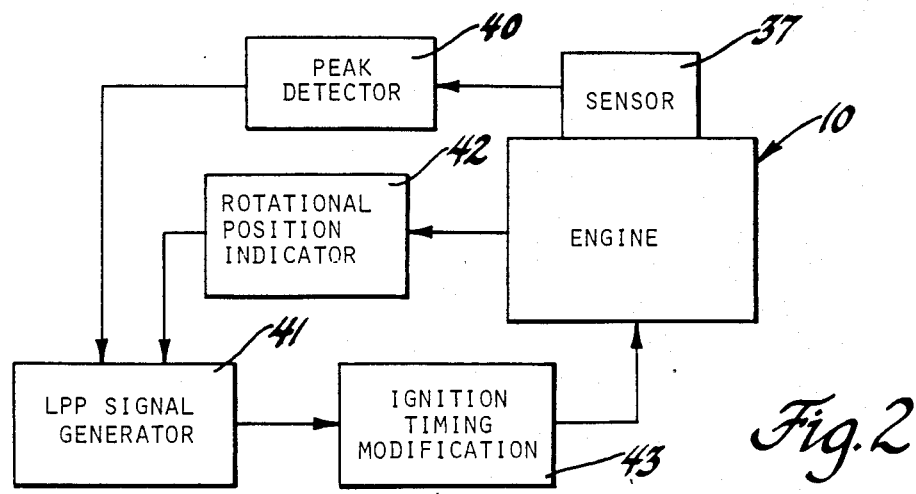
FIG. 2 is a block diagram of an LPP ignition timing control system using a sensor according to this invention.

FIG. 2 shows a complete LPP ignition timing control system in block diagram form. Engine 10 and sensor 37 have already been shown and described. The output of sensor 37 is provided to a peak detector 40 which determines the peak value of the sensor signal for each combustion event and generates a pulse at the time thereof. Peak detector 40 may be of the differentiating type, with suitable low pass filtering to smooth the signal before differentiation. A system of this type is described in the Brandt U.S. pat. No. 4,406,265, issued Sept. 27, 1983. With a filtering and differentiating system, the phase lag introduced by filtering should be kept to a minimum and must in any event be taken into account, since it affects the apparent location of peak pressure in the filtered signal. Another method is to detect and generate pulses for each peak exceeding a previous peak, with a pulse generated for each. In this case, no phase shift is introduced. The timing of each peak is determined and stored in a memory location, with each succeeding timing number replacing the last. At the end of the combustion event, the number remaining in the memory location represents LPP. An example of this type of system is shown in the Karau et al U.S. Pat. No. 4,481,925, issued Nov. 13, 1984. In any event, suitable peak detection apparatus is not limited to these systems but includes many other systems known in the art.

The peak detection information is compared, in LPP signal generator 41, with information from a rotational position indicator 42, driven by the crankshaft of engine 10, to indicate the actual crankshaft angle of LPP. Rotational position indicator 42 may be a multi-toothed wheel or gear rotating with the crankshaft with reluctance, Hall effect, optical or other pulse generating apparatus and pulse counting apparatus effective to indicate the times of successive rotational positions of the crankshaft relative to TDC. If the crank angle between pulses is greater than that required for the desired angular resolution, an interpolation may be performed assuming constant rotational speed between the pulses. Digital computing apparatus may be used if required. It is also desirable to have at least one indexing pulse per crankshaft rotation which is distinguishable from the other pulses, so that the system is given actual TDC information on a regular basis.

LPP signal generator 41 may be the aforementioned digital computing apparatus or other suitable apparatus which compares the derived LPP value with a desired LPP value and generates an error signal. The error signal is provided to ignition timing modification apparatus 43, which adjusts ignition timing in a well known manner to reduce the error signal.

The embodiments of the invention in which an exclusive property or privilege is claimed are defined as follows:

1. In an internal combustion engine having a rotating crankshaft, a combustion chamber with an intake valve opening thereto, means to introduce a combustible charge through the intake valve opening, means to initiate ignition of the combustible charge, and a poppet valve effective to close the intake valve opening during combustion, the poppet valve comprising a valve closing member deformable by combustion pressure, a stem effective to move longitudinally in response to said deformation and a detectable member effective to move with the stem during the longitudinal movement thereof, peak combustion pressure timing sensing apparatus comprising:

a probe fixed with respect to the stationary portion of the engine and disposed adjacent the detectable member so as to be sensitive to the longitudinal position thereof, the probe being effective to generate an output electric signal varying with the longitudinal position of the detectable member and therefore of the valve stem, the output electric signal reaching a detectable peak value concurrent with peak combustion chamber pressure and resulting peak deformation of the valve closing member; and means effective to reference the peak value with the crankshaft rotational position of the engine so as to indicate the timing thereof.

2. The peak combustion pressure timing sensing apparatus of claim 1 in which the detectable member is the valve spring retainer.

* * * * *